United States Patent Office

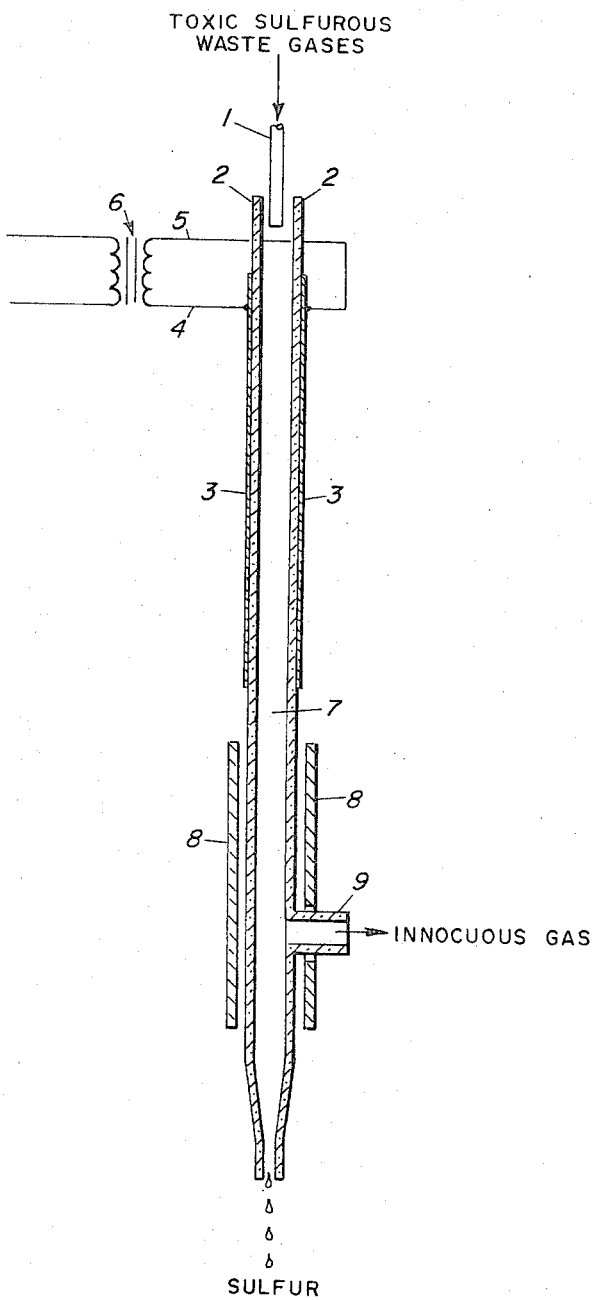

3,783,116
Patented Jan. 1, 1974

3,783,116
DECOMPOSITION OF CARBONYL SULFIDE (COS) IN ELECTRIC CHARGE
Larry A. Haas, Burnsville, and Sanaa E. Khalafalla, Minneapolis, Minn., assignors to the United States of America as represented by the Secretary of the Interior
Filed Jan. 26, 1973, Ser. No. 326,646
Int. Cl. B01d 53/34; C01b 17/04, 31/18
U.S. Cl. 204—164  7 Claims

ABSTRACT OF THE DISCLOSURE

COS is passed through an electrical discharge gap to decompose into CO and S.

---

This invention relates to removing COS from gases.

Carbonyl sulfide is a by-product of petroleum refineries and many chemical processes including reduction processes involving $CO_2$ and metal sulfides. It is also present in coke oven-, coal-, carburetted water- and producer-gas, as well as in cracked or reformed petroleum gas. Further, it is a by-product in iron- and steel-making processes.

Due to its low boiling point, it is a difficult compound to separate out by fractionation. Furthermore, it is relatively stable toward acidic reagents and is only slowly affected by strongly alkaline agents.

Heretofore it has ben removed from $SO_2$-containing gas in the presence of a catalyst at about 400° C. It has also been thermally decomposed to CO, $S_x$, $CO_2$ and $CS_2$. Still further it has ben removed from hydrocarbon fluids by the use of a molecular sieve which desorbed the gas upon heating. The disadvantages of these thermal methods are that temperatures above 400° C. are usually required to obtain elemental sulfur and that some sulfur is lost as gaseous $CS_2$.

We have now developed a process for the decomposition of COS to CO and CS at room temperature and normal atmospheric pressures by use of an electrical discharge. No other sulfur-containing compound such as $CS_2$ is obtained.

It is therefore an object of the present invention to decompose gaseous COS into carbon monoxide and sulfur.

Another object is to decompose COS without producing other sulfur compounds such as $CS_2$.

A further object is to decompose COS at room temperature and at atmospheric pressures.

Other objects and advantages will be obvious from the following more detailed description of the invention taken in conjunction with the drawing in which the figure shows an exemplary apparatus for carrying out the invention.

In the practice of the present invention the COS containing gas is passed through a narrow gap between two electrodes which produce at least one kilovolt voltage drop per millimeter of gap-width, preferably at least 3 kv./mm. In addition, the electrodes preferably are maintained out of contact with the gas (e.g., a glass membrane disposed between gas and electrode) so as to eliminate possible side reactions at the electrode.

Room temperature (about 20–25° C.) in the reactor is suitable. Although lower or higher temperatures can be employed, higher temperature (about 90° C.–150° C.) markedly reduces COS decomposition. As to pressure, reduced operating pressures (e.g. 217 to 396 torr) achieve a higher conversion rate of the COS, although as much as half of the COS can be converted at atmospheric pressure.

Since the presence of other compounds such as $CO_2$ and $SO_2$ do not adversely affect the present invention, the process is especially effective in combination with a process for CO- or natural gas-reduction of $SO_2$-containing waste gas which produces S, COS, etc. Exemplary reduction processes are disclosed in U.S. Pats. Nos. 3,199,955 and 3,615,219.

Although water vapor does not prevent COS decomposition, it substantially reduces efficiency. Accordingly, it is desirable to remove moisture prior to decomposition by electrical discharge.

An exemplary apparatus for carrying out the invention is shown in the figure. Reference numeral 1 designates an inlet conduit for the COS containing gas. The gas passes between parallel plates of glass 2 or other insulating plates. On the outer surface of the upper portion of each glass plate is disposed aluminum foil 3 or silver paint. Secondary leads 4 and 5 from high voltage transformer 6 are attached to the foils 3.

When product gas has reached the area designated as numeral 7 between parallel plates 2, the COS has been substantially converted to CO and S. Accordingly, the lower section of plates 2 may be surrounded by intermittent heater 8 to melt the sulfur whereby molten sulfur passes out the bottom of the plates to suitable collection.

Product gas which is now substantially free COS leaves the unit through conduit 9, and may be collected or further treated to remove constituents such as CO. If the CO is present in high concentrations, the product gas can be used directly as a reducer gas.

In the following examples, operating variables of the process of the present invention are examined.

EXAMPLE I

Carbonyl sulfide mixed with nitrogen or helium was passed through a typical laboratory ozonizer. The gas was exposed to a discharge in a 1-mm. annular region formed by two concentric glass tubes. The reactor discharge volume was 23.9 cc. and the electrode area was 228 $cm.^2$. Electrical power was supplied to the reactor with a 17-kilovolt Jefferson transformer at 120 v. AC. The gases were analyzed by means of a gas chromatograph. The percent conversion ($x$) of SCO was determined as a function of the incoming gas flow in the range of 411 to 1941 cc./min. The residence time of the gas was calculated as the ratio of the reactor volume to the volumetric gas flow rate. The reaction yield per minute (R) was calculated as the product of the COS mass flow in milligrams times its fractional conversion. The results obtained are shown in Table 1.

It is apparent from the first four rows of these data that the yield per unit volume does not change appreciably with gas residence time in the range of 0.012 to 0.058 minutes or gas flow of 411 to 1941 cc./min.

The effect of electrode area or reactor volume is shown in the second four rows of data in Table 1. It is evident from the last column that the yield per cc. of reactor volume increases with reactor size. Therefore, a large reactor would appear to be more efficient than a smaller one.

EXAMPLE 2

The effect of COS concentration on the reaction rate was investigated as different commercial processes contain different concentration levels of COS. Helium was used as a diluent. In this test the reactor volume was 23.9 ml., the electrode gap was 1 mm., the electrode area 172 $cm.^2$, the applied voltage 17 kv. The results obtained are shown in Table 2.

It is evident from the first and last column of Table 2 that the COS decomposition yield increases with the amount of COS in the inlet gas at levels below 8.5 percent but a saturation value is obtained above this concentration. Most commercial processes generate much smaller amount of COS than the saturation value.

EXAMPLE 3

The effect of total pressure on the COS conversion was also investigated. The energy attained by an electron in a discharge reactor is dependent on the mean free path or gas pressure. Higher electron velocities are obtained at low pressures and are more effective in decomposing COS. Experimental results in Table 3 show that 88 percent of the COS was decomposed at 217 torr (0.286 atmospheres) while at atmospheric pressures, only about half of the SCO was converted.

EXAMPLE 4

The electrode gap was increased while holding the electrode height constant at 36.5 cm. This increased the reactor volume and decreased the linear gas velocity. It is evident from Table 4 that the reaction yield per unit volume appears to increase as the electrode gap becomes larger.

What is claimed is:

1. A process for decomposing COS comprising passing COS-containing gas through an ozonizer type electrical discharge gap across which there is a voltage drop of at least one kv./mm. of gap width so as to decompose said COS into CO and S, and removing COS-depleted gas from said zone.

2. The process of claim 1 wherein said gaseous COS is out of direct contact with the electrodes which generate said electrical discharge.

3. The process of claim 1 wherein said COS-containing gas is produced by catalytically reducing a sulfur dioxide-containing waste gas with carbonaceous reductants.

4. The process of claim 1 wherein said voltage drop is at least 3 kv./mm.

5. The process of claim 2 wherein said COS-containing gas is produced by catalytically reducing a sulfur dioxide-containing waste gas with carbonaceous reductants.

6. The process of claim 2 wherein said voltage drop is at least 3 kv./mm.

TABLE 1.—EFFECT OF FLOW RATE AND REACTOR VOLUME ON COS DECOMPOSITION IN A SILENT ELECTRICAL DISCHARGE

| Flow rate, ml./min. | Electrode area cm.$^2$ | Reactor volume (v.), ml. | Residence time, min.×10$^2$ | COS analysis, percent | | | Conversion $x$, percent | R, mg. COS removed per min. | Yield per unit volume (R/v.) |
|---|---|---|---|---|---|---|---|---|---|
| | | | | Inlet | Exhaust | Removed | | | |
| 411 | 228 | 23.9 | 5.8 | 3.52 | 2.20 | 1.32 | 37.5 | 14.5 | 0.61 |
| 677 | 228 | 23.9 | 3.5 | 3.55 | 2.72 | 0.83 | 23.4 | 15.0 | .63 |
| 1,392 | 228 | 23.9 | 1.7 | 3.45 | 3.05 | .40 | 11.6 | 14.9 | .62 |
| 1,941 | 228 | 23.9 | 1.2 | 3.61 | 3.32 | .29 | 8.0 | 15.1 | .63 |
| 682 | 57 | 6.0 | 0.9 | 3.35 | 3.26 | .09 | 2.7 | 1.6 | .27 |
| 682 | 115 | 12.0 | 1.8 | 3.35 | 3.15 | .20 | 6.0 | 3.6 | .30 |
| 683 | 172 | 17.9 | 2.6 | 3.45 | 2.97 | .48 | 13.9 | 8.8 | .49 |
| 683 | 228 | 23.9 | 3.5 | 3.43 | 2.76 | .67 | 19.5 | 12.2 | .51 |

TABLE 2.—EFFECT OF COS INLET CONCENTRATION ON COS DECOMPOSITION IN AN ELECTRICAL DISCHARGE

| COS analysis, percent | | | Fractional conversion, $x$ | Total flow, cc./min. | R, mg. COS removed per min. |
|---|---|---|---|---|---|
| Inlet | Exhaust | Removed | | | |
| 0.13 | 0.11 | 0.02 | 0.15 | 305 | 0.2 |
| .9 | .4 | .5 | .56 | 301 | 4.0 |
| 2.9 | 2.1 | .8 | .28 | 342 | 7.3 |
| 6.9 | 5.6 | 1.3 | .19 | 350 | 12.1 |
| 8.5 | 7.2 | 1.3 | .15 | 360 | 12.5 |
| 9.8 | 8.5 | 1.3 | .13 | 360 | 12.5 |
| 10.6 | 9.3 | 1.3 | .12 | 360 | 12.5 |

TABLE 3.—EFFECT OF TOTAL PRESSURE ON THE COS DECOMPOSITION

| Absolute pressure, torr | COS analysis, percent | | | COS conversion, percent | Flow, cc./min. | Millimoles of COS decomposed per minute |
|---|---|---|---|---|---|---|
| | Inlet | Exhaust | Removed | | | |
| 217 | 0.75 | 0.09 | 0.66 | 88 | 420 | 0.12 |
| 396 | 1.11 | .29 | .82 | 74 | 420 | .15 |
| 588 | 1.89 | .97 | .92 | 49 | 420 | .17 |
| 723 | 2.75 | 1.69 | 1.06 | 38 | 420 | .20 |
| 776 | 1.83 | 0.91 | 0.92 | 50 | 420 | .17 |
| 779 | 2.00 | 1.20 | .80 | 40 | 435 | .16 |
| 896 | 3.44 | 2.00 | 1.44 | 42 | 435 | .28 |
| 900 | 2.99 | 1.47 | 1.52 | 51 | 420 | .28 |

TABLE 4.—EFFECT OF ELECTRODE GAP OR LINEAR GAS VELOCITY ON COS DECOMPOSITION

| Gap, cm. | Volume (v.), cc. | Flow (f), cc./min. | Cross-sectional area (A), cm.$^2$ | $f/A$, cm./min. | COS analyses, percent | | | COS conversion, percent | R, mg. COS removed per min. | R/v. removed per min. per cc. |
|---|---|---|---|---|---|---|---|---|---|---|
| | | | | | Inlet | Exhaust | Removed | | | |
| 0.1 | 28 | 313 | 0.79 | 396 | 2.62 | 2.33 | 0.29 | 12.4 | 2.4 | 0.086 |
| .1 | 28 | 313 | .79 | 396 | 2.62 | 2.32 | .30 | 12.9 | 2.5 | .089 |
| .2 | 55 | 505 | 1.50 | 337 | 2.58 | 2.07 | .51 | 19.8 | 6.9 | .125 |
| .2 | 55 | 500 | 1.50 | 333 | 2.62 | 2.09 | .51 | 19.5 | 6.8 | .124 |
| .35 | 90 | 530 | 2.47 | 215 | 2.60 | 1.06 | 1.54 | 59.0 | 21.8 | .243 |
| .35 | 81 | 237 | 2.47 | 96.1 | 2.63 | 0.51 | 2.12 | 80.0 | 13.5 | .167 |

7. The process of claim 5 wherein said voltage drop is at least 3 kv./mm.

References Cited

UNITED STATES PATENTS

| | | | |
|---|---|---|---|
| 3,188,167 | 6/1965 | Specht | 204—164 X |
| 3,562,127 | 2/1971 | Wooten et al. | 204—164 |
| 3,562,128 | 2/1971 | Coffey | 204—193 |
| 3,616,461 | 10/1971 | Gorin | 204—164 X |

FOREIGN PATENTS

| | | | |
|---|---|---|---|
| 286,739 | 5/1966 | Australia | 423—242 |
| 738,318 | 7/1966 | Canada | 423—242 |

FREDERICK C. EDMUNDSON, Primary Examiner

U.S. Cl. X.R.

423—242, 415, 570